United States Patent [19]

Csotonyi

[11] Patent Number: 5,114,386
[45] Date of Patent: May 19, 1992

[54] REVERSIBLE VARIABLE SPEED DRIVE MECHANISM

[76] Inventor: Gyula Csotonyi, Box 346, Wabamum, Alberta, Canada, T0E 2K0

[21] Appl. No.: 661,601

[22] Filed: Feb. 28, 1991

[51] Int. Cl.⁵ .............................................. F16H 37/00
[52] U.S. Cl. .................... 475/211; 475/212; 475/218
[58] Field of Search ............... 475/207, 210, 211, 212, 475/213, 218

[56] References Cited

U.S. PATENT DOCUMENTS

| | | | |
|---|---|---|---|
| 1,156,132 | 10/1915 | Chapman . | |
| 2,101,845 | 12/1937 | Fraser | 74/280 |
| 2,146,687 | 2/1939 | Regan | 74/301 |
| 2,179,933 | 11/1939 | Heyer | 74/286 |
| 2,259,823 | 10/1941 | Locke | 74/286 |
| 2,509,685 | 5/1950 | Hughes | 74/689 |
| 2,514,158 | 7/1950 | Hussain | 74/681 |
| 2,653,490 | 9/1953 | Testori | 74/689 |
| 2,889,716 | 6/1959 | Doty | 74/689 |
| 3,091,132 | 5/1963 | Mayfield et al. | 74/722 |
| 3,527,119 | 9/1970 | Nasvytis | 74/681 |
| 4,295,391 | 10/1981 | Philpitt et al. | 74/782 |
| 4,553,450 | 11/1985 | Gizard | 475/212 |
| 4,589,303 | 5/1986 | Roberts | 475/211 |
| 4,682,511 | 7/1987 | Wittke | 74/681 |
| 4,990,127 | 2/1991 | Roberts et al. | 475/212 X |

FOREIGN PATENT DOCUMENTS

| | | | |
|---|---|---|---|
| 473170 | 1/1954 | Italy | 475/211 |
| 56-49452 | 5/1981 | Japan | 475/211 |

OTHER PUBLICATIONS

Article Mar./Apr. 1983/33 Science & Mechanics CVT's Efficiency and Economy.
Article Dec. 1988 Popular Mechanics Imports'89 Article Automotive Newsfront Popular Science.

*Primary Examiner*—Leslie A. Braun
*Assistant Examiner*—Ryan W. Massey
*Attorney, Agent, or Firm*—Beveridge, DeGrandi & Weilacher

[57] ABSTRACT

A reversible variable speed drive mechanism is disclosed formed of an engine crankshaft and a balancing shaft parallel to the crankshaft. A second pulley is nonrotatably secured to a first end of the balancing shaft. The second pulley is coupled to a first pulley at a first end of the crank shaft by a belt. The second pulley has a belt supporting circumference which is adjustable such that the speed of the balancing shaft is adjustable by altering the circumference around which the belt travels. A planetary gear assembly is coupled to a second end of the crankshaft. The balancing shaft sprocket is coupled by a chain to a sprocket on the planetary yoke such that the rotation of the planetary yoke is coupled to the rotation of the balancing shaft. By altering the rotational speed of planetary yoke relative to an input gear, the output gear can be made to rotate in a first direction, in a second direction or assume a neutral stationary position. A locking sprocket is rotatably mounted on the balancing shaft. The locking sprocket is coupled by a chain to a sprocket on the input gear such that the locking sprocket rotates in response to rotation of the input gear. By locking the locking sprocket to the balancing shaft when the output gear is in a neutral position, the speed of the planetary yoke relative to the input gear is maintained.

5 Claims, 5 Drawing Sheets

REVERSIBLE VARIABLE SPEED DRIVE MECHANISM

The present invention relates to a reversible variable speed drive mechanism.

BACKGROUND OF THE INVENTION

There is considerable art relating to reversible variable speed drive mechanisms. Representative of that art are U.S. Pat. Nos. 2,179,933, and 2,889,716. Both of the patents referred to operate on a common principle. A balancing shaft is placed parallel to the drive shaft of an engine. A belt is connected between a pulley on the drive shaft and a pulley on the balancing shaft, so that the drive shaft imparts a rotational motion to the balancing shaft. By adjusting the rotational circumference of one of the pulleys supporting the belt the rotational speed of the balancing shaft can be adjusted relative to the rotational speed of the drive shaft. The drive shaft is coupled to one of the gears of a planetary gear assembly. The balancing shaft is coupled to another of the gears of the planetary gear assembly. By adjusting the relative speeds of the drive shaft and the balancing shaft the output gear of the planetary gear assembly can be made to rotate in either direction or maintain a stationary or neutral position.

These reversible variable speed drive mechanisms have not become widely used in motor vehicles for a number of reasons. One reason is that the configurations known in the art are often not suited for placement under the hood of an automobile. Another reason is that the devices can not be relied upon to maintain a neutral setting when left unattended. The belts used are subject to stretching. As soon as the speed of the balancing shaft is altered relative to the drive shaft by the stretching of a belt movement of the output shaft occurs.

SUMMARY OF THE INVENTION

What is required is a configuration of reversible variable speed drive mechanism which is suited for use in motor vehicles.

According to the present invention there is provided an improvement in a reversible variable speed drive mechanism. These reversible variable speed drive mechanisms generally consist of a motor driven input shaft having a first end and a second end together with a balancing shaft having a first end and a second end rotatably mounted on supports and extending parallel to the input shaft. A first pulley is non-rotatably secured to the first end of the input shaft, and a second pulley is non-rotatably secured to the first end of the balancing shaft and coupled to the first pulley with a belt whereby a rotational movement is imparted by the input shaft to the balancing shaft. One of the pulleys has a belt supporting circumference which is adjustable such that the relative speed of the shafts is adjustable by altering the circumference of the adjustable pulley around which the belt travels. A planetary gear assembly is provided having an input gear, a plurality of planetary gears contained in a yoke, and an output gear rotatably driven by the planetary gears. One of the input gears or yoke is coupled to the second end of the input shaft and the other of the input gear or yoke is coupled to the second end of the balancing shaft. By adjusting the belt supporting circumference of the adjustable pulley the relative rotational speed of the input shaft and the balancing shaft and the relative rotational speed of the input gear and the planetary yoke can be altered such that when the rotational speed of the planetary yoke relative to the input gear is greater than the gear ratio, the output gear rotates in a first direction; when the rotational speed of the planetary yoke relative to the input gear is less than the gear ratio, the output gear rotates in a second direction; and when the rotational speed of the planetary yoke relative to the input gear corresponds to the gear ratio, the output gear assumes a neutral position remaining stationary. The improvement is comprised of a balancing sprocket mounted on the second end of the balancing shaft. The balancing sprocket is coupled by a chain to the planetary yoke. A locking sprocket is also rotatably mounted on the balancing shaft. The locking sprocket is coupled by a chain to the input gear such that the locking sprocket rotates in response to rotation of the input gear. Means is provided for locking the locking sprocket to the balancing shaft when the output gear is in a neutral position, thereby preventin the speed of the planetary yoke from being altered relative to the speed of the input gear.

By maintaining the speed of the planetary yoke relative to the speed of the input gear, the locking sprocket of the present invention prevents the reversible variable speed drive mechanism from moving out of a neutral position. There are various means which can be employed to lock the locking sprocket to the balancing shaft. The means for locking the locking sprocket to the balancing shaft which the Applicant prefers uses a locking sleeve non-rotatably coupled to the balancing shaft. The locking sleeve is slidable between a disengaged position disengaged from the locking sprocket and an engaged position non-rotatably coupled with the locking sprocket.

BRIEF DESCRIPTION OF THE DRAWINGS

These and other features of the invention will become more apparent from the following description in which reference is made to the appended drawings wherein.

DETAILED DESCRIPTION OF THE PREFERRED EMBODIMENT

Figure 1:
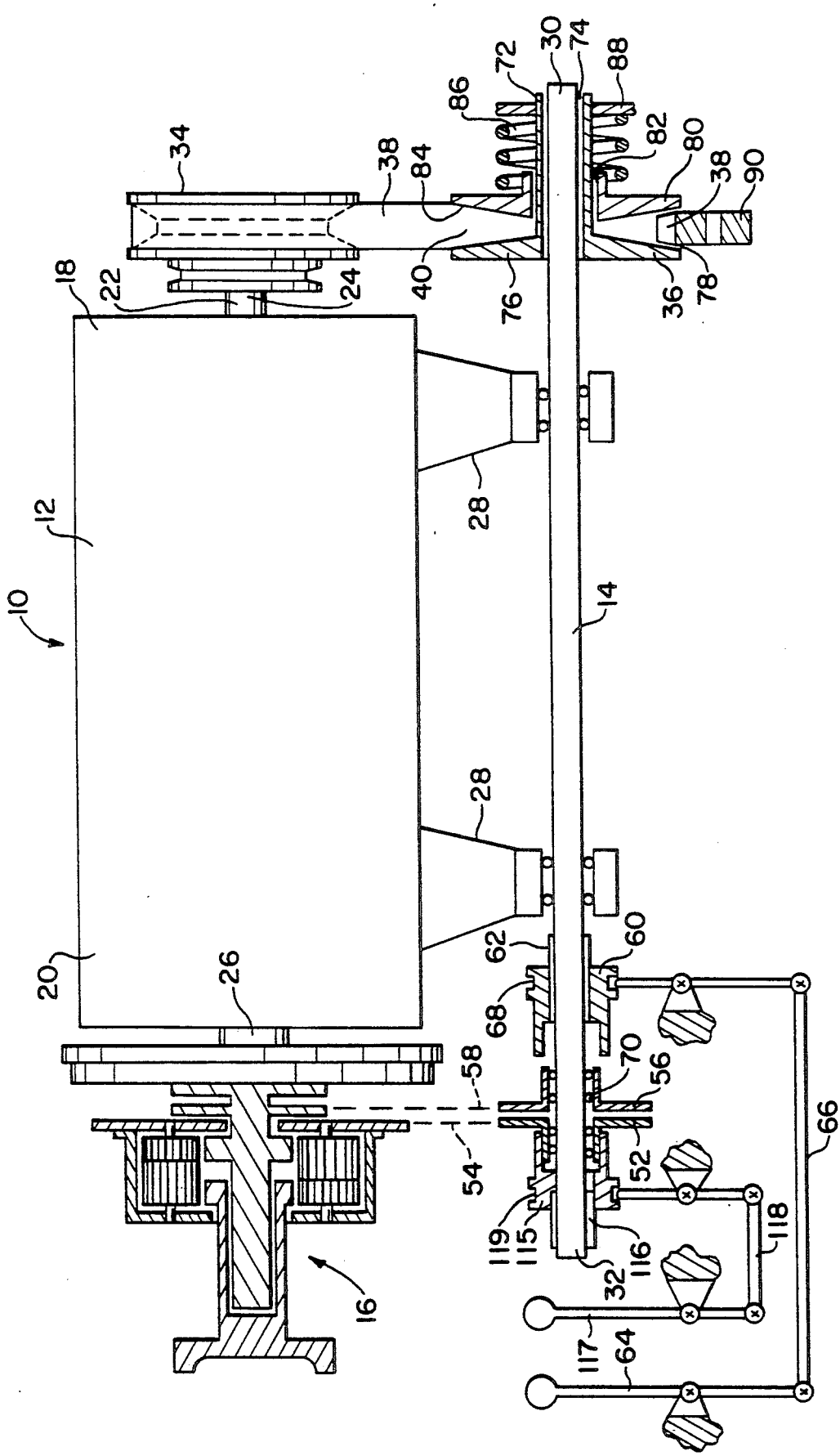
FIG. 1 is a top plan view of a reversible variable speed drive mechanism constructed in accordance with the teachings of the present invention.

The preferred embodiment, a reversible variable speed drive mechanism generally referred to by reference numeral 10, will now be described with reference to FIGS. 1 through 4. An alternate embodiment will also be described with reference to FIGS. 5 and 6.

Figure 2:
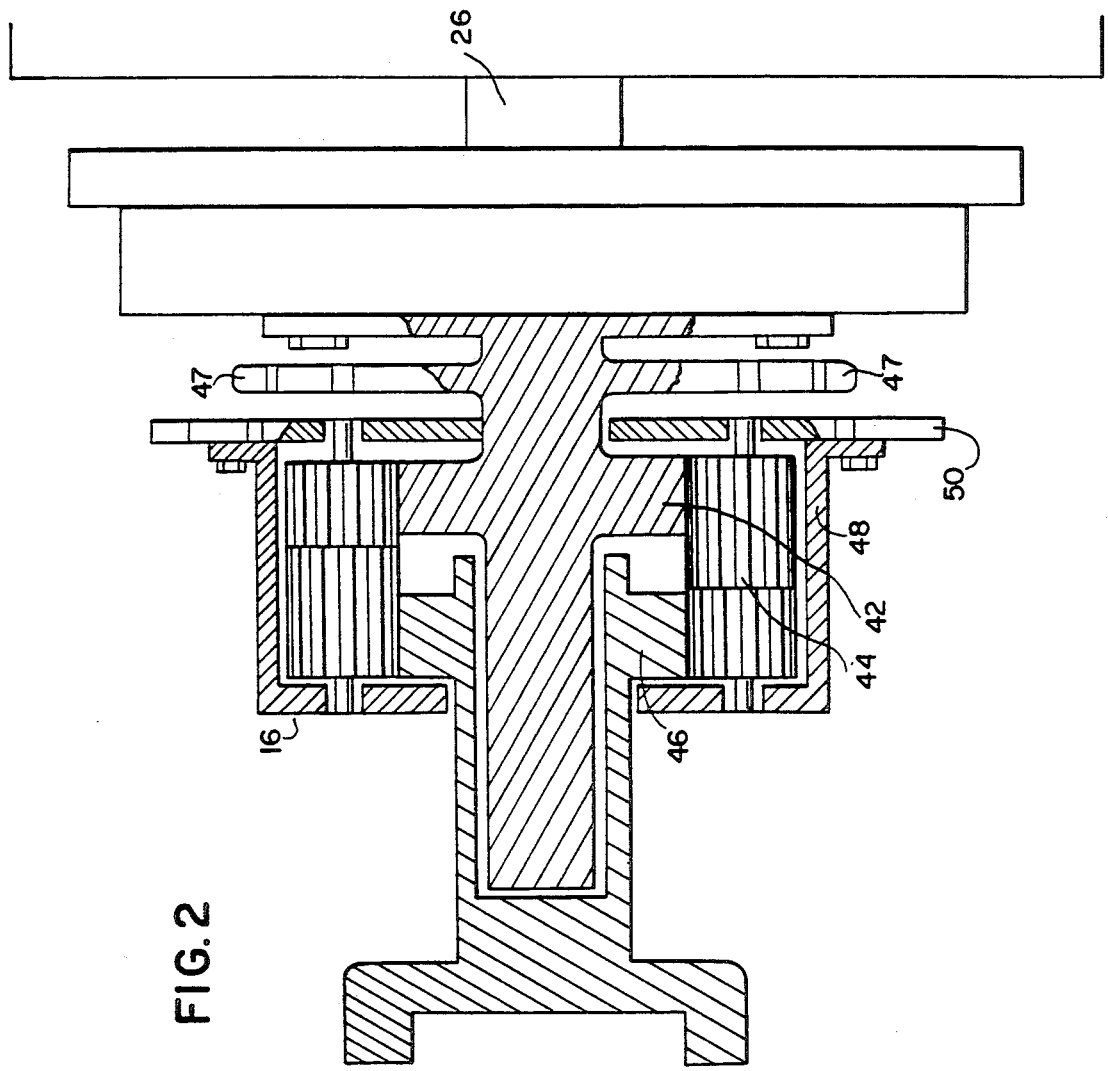
FIG. 2 is a detailed top plan view of a portion of the reversible variable speed drive mechanism illustrated in FIG. 1.
Figure 3:
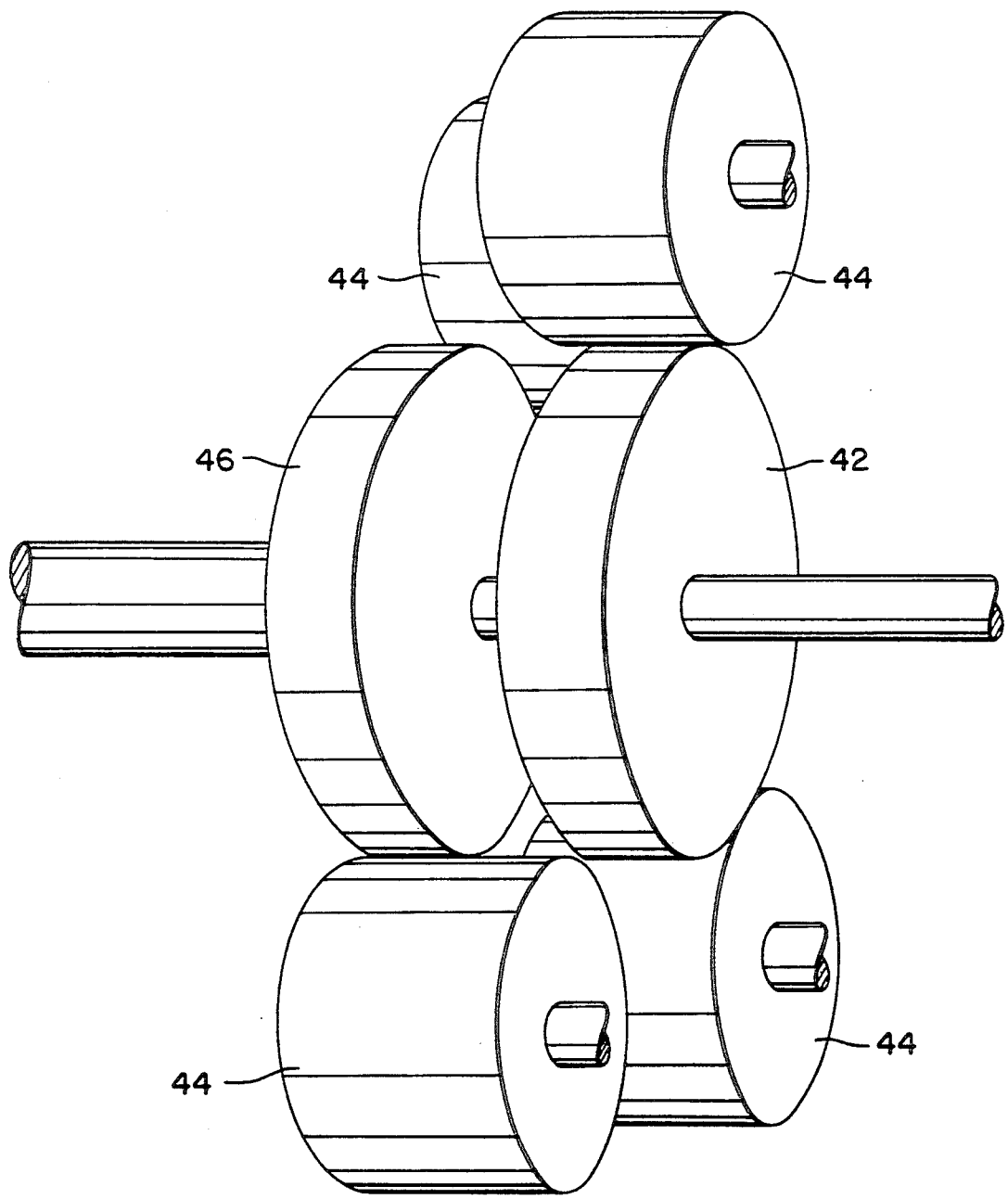
FIG. 3 is a perspective view of the planetary gear assembly employed in the reversible variable speed drive mechanism illustrated in FIG. 1.

The primary components of reversible variable speed drive mechanism 10 are an engine 12, a balancing shaft 14, and a fixed ratio planetary gear assembly 16. Referring to FIG. 1, engine 12 has a first end 18 and a second end 20. Engine 12 has a crankshaft 22 with a first end 24 extending from first end 18 and a second end 26 extending from second end 20. Crankshaft 22 serves as a motor driven input shaft to reversible variable speed drive mechanism 10. Balancing shaft 14 is rotatably mounted on supports 28. Balancing shaft 14 is aligned substantially parallel to engine 12 with a first end 30 parallel to the first end 24 of crankshaft 22 and a second end 32 parallel to second end 26 of crankshaft 22. A first pulley 34 is non-rotatably secured to first end 24 of crankshaft 22. A second pulley 36 is non-rotatably secured to first end 30 of balancing shaft 14 by spline (not shown) and is capable of limited axial movement. This limited axial movement plays a role in the operation of reversible variable speed drive mechanism 10, which will hereinafter be described. Second pulley 36 is coupled to first pulley 34 with a belt 38, whereby a rotational movement is imparted by crankshaft 22 to balancing shaft 14. Second pulley 36 has a belt supporting circumference 40 which is adjustable such that the speed of the balancing shaft 14 is adjustable by altering the circumference around which belt 38 travels. The means of adjusting belt supporting circumference 40 of second pulley 36 will be hereinafter described in more detail. Fixed ratio planetary gear assembly 16 is coupled to second end 26 of crankshaft 22. Referring to FIGS. 2 and 3, planetary gear assembly 16 is comprised of an a sun or input gear 42, a plurality of planetary gears 44 and an output gear 46 (which serves as a substitute for a conventional ring gear). Input gear 42 is coupled with second end 26 of crankshaft 22. Input gear 42 has a sprocket 47. Planetary gears 44 orbit input gear 42. Planetary gears 44 are contained in a yoke 48 which also has a sprocket 50. Output gear 46 is rotatably driven by planetary gears 44. A sprocket 52 is mounted on second end 32 of balancing shaft 14. At all normal times sprocket 52 would be non-rotatably mounted to balancing shaft 14. There is, however, some advantages in being able to let sprocket 52 and balancing shaft 14 rotate independently when towing the vehicle or starting the vehicle after it has stalled. These circumstances will hereinafter be further described in relation to the operation of the vehicle. The means used to non-rotatably couple sprocket 52 to balancing shaft 14 is a locking sleeve 115 non-rotatably coupled to balancing shaft 14. Locking sleeve 115 is slidable between a disengaged position, disengaged from sprocket 52 and an engaged position non-rotatably coupled with sprocket 52. Sleeve 115 is non-rotatably coupled to balancing shaft 14 through the use of spline 116. Sleeve 115 is moved between the engaged and disengaged positions through the use of a lever 117 which is connected to sleeve 115 by a linkage 118. Linkage 118 is positioned in a groove 119 in sleeve 115 in order to control the axial movement of sleeve 115 while still permitting sleeve 115 to rotate with balancing shaft 14. When lever 117 is pulled to move sleeve 115 into an engaged position sleeve 115 telescopically slides over a protruding collar 120 on sprocket 52 in a friction fit which results in sprocket 52 turning with balancing shaft 14. In order to improve the engagement between sleeve 115 and collar 120 of sprocket 52, these components can be equipped with mating spline. Balancing shaft sprocket 52 is coupled by a chain 54 to sprocket 50 on planetary yoke 48, such that the rotation of planetary yoke 48 is coupled to the rotation of balancing shaft 14. The planetary gear assembly has been referred to as being "fixed ratio". The reference to "fixed ratio" generally refers to the ratio between input gear 42 and the gear to which balancing shaft 14 is coupled. With the illustrated embodiment, balancing shaft 14 is coupled with planetary yoke 48. The gear ratio is considered to be 2 to 1 as input gear 42 must rotate two times for every one time planetary yoke 48 rotates. The importance of this gear ratio will become apparent in relation to the description of the operation of reversible variable speed drive mechanism 10. By altering the rotational speed of planetary yoke 48 relative to input gear 42, output gear 46 can be made to rotate in a first direction, in a second direction or assume a neutral stationary position. A locking sprocket 56 is rotatably mounted on balancing shaft 14. Locking sprocket 56 is coupled by a chain 58 to sprocket 47 on input gear 42. It should be noted that in normal operation locking sprocket 56 freely rotates on balancing shaft 14 in response to rotation of input gear 42. However, when output gear 46 is in a neutral position, locking sprocket 56 may be locked to balancing shaft 14 so that the speed of planetary yoke 48 in relation to the speed of input gear 42 cannot be altered. The importance of being able to fix the speed of planetary yoke 48 in relation to the speed of input gear 42 will become apparent in the description of the operation of reversible variable speed drive mechanism 42.

Referring to FIG. 1, in the illustrated embodiment locking sprocket 56 is locked to balancing shaft 14 by means of a locking sleeve 60 non-rotatably coupled to balancing shaft 14. Locking sleeve 60 is slidable between a disengaged position, disengaged from locking sprocket 56 and an engaged position nonrotatably coupled with locking sprocket 56. Sleeve 60 is non-rotatably coupled to balancing shaft 14 through the use of spline 62. Sleeve 60 is moved between the engaged and disengaged positions through the use of a lever 64 which is connected to sleeve 60 by a linkage 66. Linkage 66 is positioned in a groove 68 in sleeve 60 in order to control the axial movement of sleeve 60 while still permitting sleeve 60 to rotate with balancing shaft 14. When lever 64 is pulled to move sleeve 60 into an engaged position sleeve 60 telescopically slides over a protruding collar 70 on sprocket 56 in a friction fit which results in sprocket 56 turning with balancing shaft 14. In order to improve the engagement between sleeve 60 and collar 70 of sprocket 56, these components can be equipped with mating spline.

Figure 4:
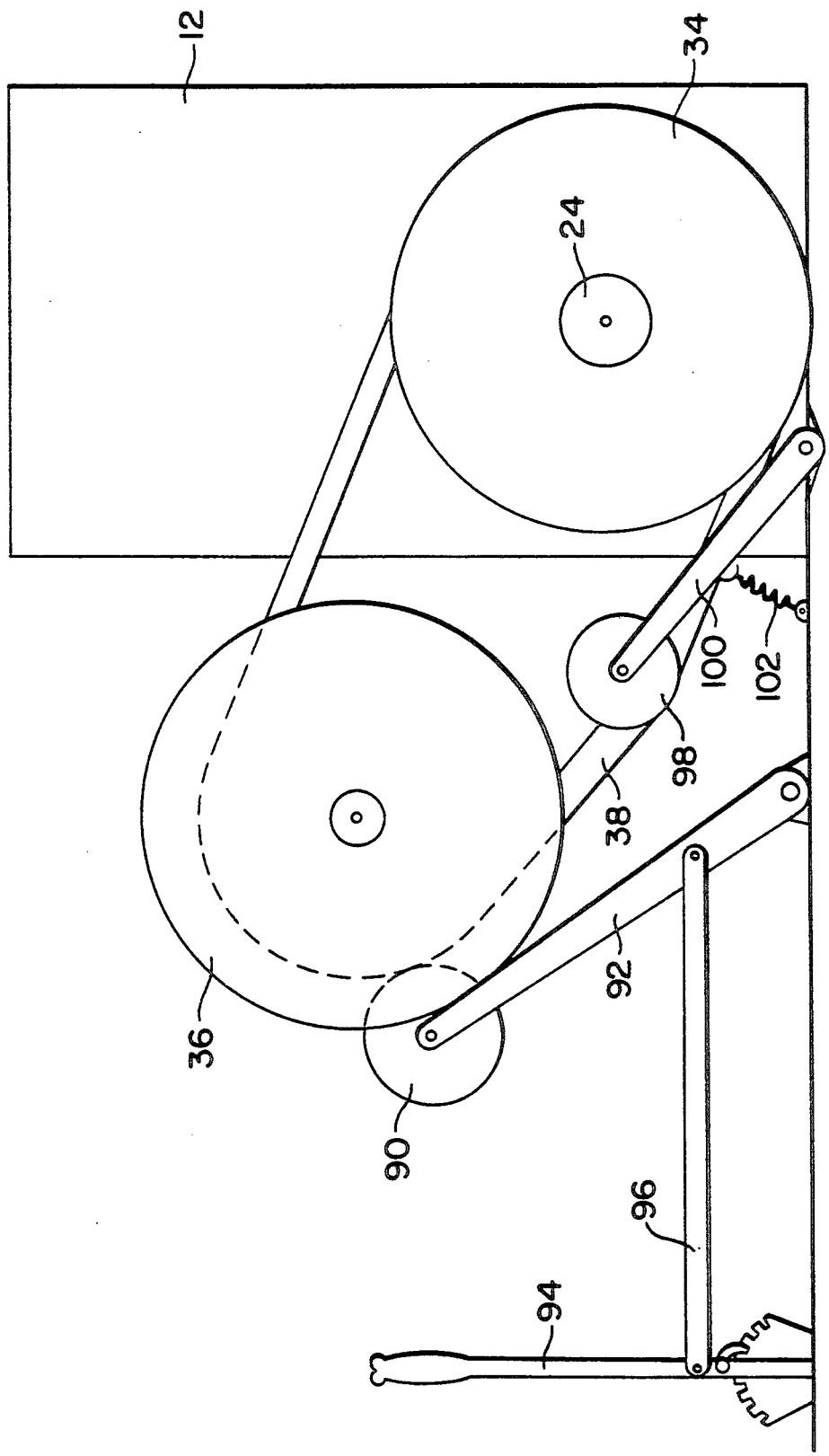
FIG. 4 is a front elevation view of the reversible variable speed drive mechanism illustrated in FIG. 1.
Figures 5, 6:
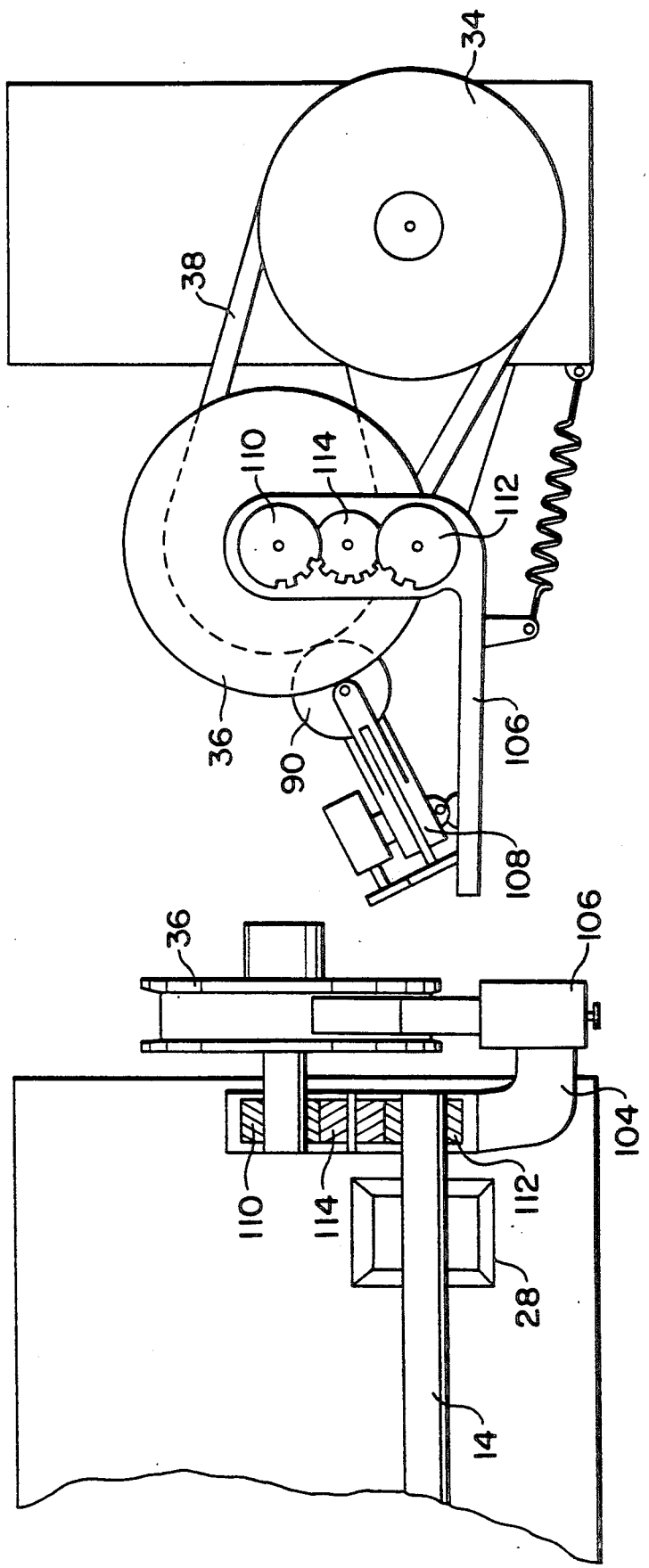
FIG. 5 is a front elevation view of an alternative embodiment of a reversible variable speed drive mechanism constructed in accordance with the teachings of the present invention.
FIG. 6 is a side elevation view of the reversible variable speed drive mechanism illustrated in FIG. 5.

Referring to FIG. 1, the means used to adjust belt supporting circumference 40 of second pulley 36 is in part related to the construction of second pulley 36. Second pulley 36 consists a sleeve 72 with a central opening 74 which receives balancing shaft 14. Integrally formed on sleeve 72 is a first annular sidewall 76 which has a wedge shaped inner surface 78. A second annular sidewall 80 having a central opening 82 which receives sleeve 72 is telescopically movable on sleeve 72. Second sidewall 80 has a wedge shaped inner surface 84. A spring 86 is positioned between second sidewall 80 and an annular shoulder 88 on sleeve 72. Spring 86 serves as a biasing means which urges inner surface 84 of second sidewall 80 toward inner surface 78 of first sidewall 76. Belt 38 is wedged between inner surfaces 78 and 84 of first sidewall 76 and second sidewall 80, respectively. The means for adjusting belt supporting circumference 40 of second pulley 36 is a roller 90 positioned between first sidewall 76 and second sidewall 80. Roller 90 exerts a force to overcome the biasing force exerted upon second sidewall 80 by spring 86. This controls the circumferential depth at which belt 38 is wedged between the inner surfaces 78 and 84 of first sidewall 76 and second sidewall 80, respectively. Roller 90 keeps belt 38 in engagement with circumference 40 of second pulley 36 and reduces slippage. It must be noted that the adjustment can be made by movement of either roller 90 or of second pulley 36 or relative movement of both. FIG. 4, illustrates an embodiment in which roller 90 is movable. In that embodiment roller 90 is mounted on a pivot arm 92 which is operated by a lever 94 with a connecting linkage 96 to pivot arm 92. A belt tightening roller 98 is also provided. Belt tightening roller 98 is connected to a pivot arm 100 which is biased by spring 102 so as to always provide pressure which takes up any slack on belt 38. Referring to FIGS. 5 and 6, an alternate embodiment is illustrated in which second pulley 36 is movable. In this embodiment second pulley 36 is indirectly coupled to balancing shaft 14 by a pivot arm 104. Pivot arm 104 is pivotally mounted to a base 106 which is shared with a fixed arm 108 supporting roller 90. Second pulley 36 is rotatably mounted on pivot arm 104. A series of three gears are used to transmit rotational motion between balancing shaft 14 and second pulley 36. A first gear 110 is coupled with second pulley 36. A second gear 112 is secured to balancing shaft 14. An idler gear 114 meshes with first gear 110 and second gear 112.

The use and operation of reversible variable speed drive mechanism 10 will now be described with reference to FIGS. 1 through 4. It is preferable that engine 12 be operated at a speed which optimises performance. The remaining components of reversible variable speed drive mechanism 10 substitute for a clutch and transmission to control the speed and direction of movement. The key to the operation of reversible variable speed drive mechanism 10, is the effect of having a dual rotational input into planetary gear assembly 16. In the preferred embodiment, one rotational input to planetary yoke 48 is by input gear 42 which transmits rotational force through planetary gears 44. A competing rotational input is by means of the linkage by chain 54 between sprocket 52 on balancing shaft 14 and sprocket 50 on planetary yoke 48. At any given time one of the rotational inputs is dominant or primary, and the other one is relegated to a secondary position. By a relative adjustment of these rotational inputs output gear 46 can be made to rotate in a first direction, in a second direction or maintain a neutral or stationary position. In a planetary gear assembly there is, of course, a ratio between the gears. When the rotational speed of the planetary yoke relative to the input gear is greater than the gear ratio, the output gear rotates in a first direction. When the rotational speed of the planetary yoke relative to the input gear is less than the gear ratio, the output gear rotates in a second direction. When the rotational speed of the planetary yoke relative to the input gear corresponds to the gear ratio, the output gear assumes a neutral position remaining stationary. The adjustment of the relative rotational inputs is accomplished by altering the rotational speed of balancing shaft 14. The rotational speed of balancing shaft 14 is altered by adjusting belt supporting circumference 40 of second pulley 36. This serves to adjust the speed of the balancing shaft 14 as it alters the circumference around which belt 38 travels. The adjustment is effected by a relative movement of roller 90 and second pulley 36 as has previously been described. Second pulley 36 is secured to balancing shaft 14 with a splined engagement (not shown). The splined engagement permits second pulley 36 to have limited axial movement. It must be recognized that as adjustments are made the centre position on second pulley 36 is altered slightly. The limited axial movement ensures that roller 90 is always properly centred between first sidewall 76 and second sidewall 80. In order to be suited for use in a motor vehicle it is important that reversible variable speed drive mechanism 10 be able to maintain a neutral position. If a neutral position cannot be maintained a motor vehicle left unattended would eventually be set into motion. The means used by the Applicant to maintain reversible variable speed drive mechanism 10 in a neutral position is by means of a locking sprocket 56. The means for locking sprocket 56 to balancing shaft 14 with locking sleeve 60 has previously been described. Engine 12 operates at a constant speed, and input gear 42 therefore rotates at a constant speed. The danger of a change in adjustment lies in the speed of balancing shaft 14. If the speed of balancing shaft 14 is altered this in turn alters the speed of planetary yoke 48 which is linked to balancing shaft 14 by chain 54 which extends between sprockets 52 and 54. However, when locking sprocket 56 is locked to balancing shaft 14, the speed of balancing shaft 14 can no longer be altered relative to input gear 42 as the rotation of balancing shaft 14 and input gear 42 are linked by chain 58 which extends between sprockets 56 and 47.

During normal operation sprocket 52 is coupled by chain 54 to sprocket 50 on planetary yoke 48. This works fine as long as engine 12 is turned off when reversible variable speed drive mechanism 10 is in a neutral position. If, however, engine 12 were to stall in other than a neutral position it may be difficult if not impossible to get engine 12 started again. In such situations lever 117 can be pulled to disengage sleeve 115 from collar 120 on sprocket 52. Once sleeve 115 has been disengaged balancing shaft 14 rotates independently of planetary yoke 48, placing reversible variable speed drive mechanism 10 in the equivalent of a neutral position. This feature is similarly useful when it is desirable to tow a vehicle having reversible variable speed drive mechanism 10.

In the above description and the claims which follow there is a specific reference to chains and sprockets. The reason for this reference is that the function requires a consistent no slip type of engagement which cannot be provided by conventional belt and pulley technology. At the present time belts used tend to expand and contract with differentials in temperature, which results in inconsistencies which alter the settings of reversible variable speed drive units. It must be recognized, however, that with advances in belt and pulley technology, there may be developed in future a belt and pulley configuration which would serve the intended function. The words "chain" and "sprocket" should accordingly be given a broad interpretation.

In order to increase torque in motor vehicles which must pull a heavy load such as trucks and farm machinery a plurality of pulleys are used. These systems are commonly referred to as "multi-pulley" systems. Most reversible variable speed drive mechanisms can not be adapted to a high torque multi-pulley configuration. There are a number of reasons for this. Some reversible variable speed drive mechanisms have pulleys with adjustable belt supporting circumferences 40 on both the crankshaft shaft and the balancing shaft. The present invention only requires a pulley with an adjustable belt supporting circumference on the balancing shaft. The pressure on multi-pulleys must be substantially the same or the pressure differential will result in one of the belts burning. The present invention permits a twin pulley with an adjustable belt supporting circumference to be placed beside second pulley 36. The supporting circumference and the pressure exerted on the belts on each pulley can be closely controlled by roller 90 and a twin roller which engages the twin pulley.

It will be apparent to one skilled in the art that reversible variable speed drive mechanism 10 represents an advance in the art in that it can readily be adapted for use in motor vehicles and can readily be locked in a neutral position. It will also be apparent to one skilled in the art that modifications may be made to the preferred embodiment without departing from the spirit and scope of the invention as defined by the claims.

The embodiments of the invention in which an exclusive property or privilege is claimed are defined as follows:

1. An improvement in a reversible variable speed drive mechanism consisting of a motor driven input shaft having a first end and a second end, a balancing shaft having a first end and a second end rotatably mounted on supports and extending parallel to the input shaft, a first pulley non-rotatably secured to the first end of the input shaft, a second pulley non-rotatably secured to the first end of the balancing shaft and coupled to the first pulley with a belt whereby a rotational movement is imparted by the input shaft to the balancing shaft, one of the pulleys having a belt supporting circumference which is adjustable such that the relative speed of the balancing shaft in relation to the input shaft is adjustable by altering the circumference of the adjustable pulley around which the belt travels, a planetary gear assembly having a sun gear, a pluarality of planetary gears contained in a yoke, a ring gear rotatably driven by the planetary gears, one of the sun gear and the ring gears serving as an input gear and the other of the sun gear and the ring gears serving as an output gear, one of the input gear, and the planetary yoke being coupled to the second end of the input shaft and the other of the input gear and the planetary yoke being coupled to the second end of the balancing shaft, such that by adjusting the belt supporting circumference of the adjustable pulley the relative rotational speed of the input shaft and the balancing shaft and the relative rotational speed of the input gear and the planetary yoke can be altered such that when the rotational speed of the planetary yoke relative to the input gear is greater than the gear ratio, the output gear rotates in a first direction; when the rotational speed of the planetary yoke relative to the input gear is less than the gear ratio, the output gear rotates in a second direction; and when the rotational speed of the planetary yoke relative to the input gear corresponds to the gear ratio, the output gear assumes a neutral position remaining stationary, the improvement comprising:
   a. a balancing sprocket mounted on the second end of the balancing shaft, the balancing sprocket being coupled by a chain to the planetary yoke;
   b. a locking sprocket rotatably mounted on the balancing shaft, the locking sprocket being coupled by a chain to the input gear such that the locking sprocket rotates in response to the rotation of the input gear; and
   c. means for locking the locking sprocket to the balancing shaft when the output gear is in a neutral position, thereby preventing the speed of the planetary yoke from being altered relative to the speed of the input gear.

2. The improvement as defined in claim 1, the balancing sprocket being rotatably mounted to the balancing shaft and means being provided for locking the balancing sprocket to the balancing shaft.

3. A reversible variable speed drive mechanism, comprising:
   a. an engine having a first end and a second end, the engine having a crankshaft with a first end extending from the first end of the engine and a second end extending from the second end of the engine;
   b. a balancing shaft rotatably mounted on supports, the balancing shaft having a first end parallel to the first end of the engine and a second end parallel to the second end of the engine;
   c. a first pulley non-rotatably secured to the first end of the crankshaft;
   d. a second pulley non-rotatably secured to the first end of the balancing shaft, the second pulley being coupled to the first pulley with a belt whereby a rotational movement is imparted by the crankshaft to the balancing shaft, the second pulley having a belt supporting circumference which is adjustable such that the speed of the balancing shaft is adjustable by altering the circumference of the second pulley around which the belt travels;
   e. a fixed ratio planetary gear assembly coupled to the second end of the crankshaft, the planetary gear assembly comprising:
      i. an input gear which is coupled with the second end of the crankshaft, the input gear having a sprocket,
      ii. a plurality of planetary gears orbiting the input gear, the planetary gears being contained in a yoke, the yoke having a sprocket, and
      iii. an output gear rotatably driven by the planetary gears;
   f. a balancing sprocket rotatably mounted on the second end of the balancing shaft, the balancing sprocket being coupled by a chain to the sprocket on the planetary yoke;
   g. means for locking the balancing sprocket to the balancing shaft such that the rotation of the planetary yoke is coupled to the rotation of the balancing shaft;
   h. means for adjusting the belt supporting circumference of the second pulley thereby altering the rotational speed of planetary yoke via the balancing shaft, such that when the rotational speed of the planetary yoke relative to the input gear is greater than the gear ratio, the output gear rotates in a first direction; when the rotational speed of the planetary yoke relative to the input gear is less than the gear ratio, the output gear rotates in a second direction; and when the rotational speed of the planetary yoke relative to the input gear corresponds to the gear ratio, the output gear assumes a neutral position remaining stationary;
   i. a locking sprocket rotatably mounted on the balancing shaft, the locking sprocket being coupled by a chain to the sprocket on the input gear such that the locking sprocket rotates in response to rotation of the input gear; and
   j. means for locking the locking sprocket to the balancing shaft when the output gear is in a neutral position, thereby preventing the speed of the planetary yoke from being altered relative to the speed of the input gear.

4. The reversible variable speed drive mechanism as defined in claim 3, the second pulley comprising:
   a. a sleeve with a central opening which receives the balancing shaft;
   b. a first annular sidewall with a wedge shaped inner surface fixed to the sleeve;
   c. a second annular sidewall having a central opening which receives the sleeve such that the second sidewall is telescopically movable on the sleeve, the second sidewall having a wedge shaped inner surface;
   d. biasing means urging the inner surface of the second sidewall toward the inner surface of the first sidewall, whereby the belt is wedged between the inner surfaces of the first sidewall and the second sidewall; and
   e. the means for adjusting the belt supporting circumference of the second pulley being a roller positioned between the first sidewall and the second sidewall such that upon relative movement of the roller and the second pulley a force is exerted which overcomes the biasing force exerted upon the second sidewall thereby controlling the circumferential depth at which the belt is wedged between the inner surfaces of the first sidewall and the second sidewall.

5. The reversible variable speed drive mechanism as defined in claim 3, the means for locking the locking sprocket to the balancing shaft being a locking sleeve non-rotatably coupled to the balancing shaft, the locking sleeve being slidable between a disengaged position disengaged from the locking sprocket and an engaged position non-rotatably coupled with the locking sprocket.

* * * * *